(12) United States Patent
Sunaga (10) Patent No.: US 11,311,881 B2
(45) Date of Patent: Apr. 26, 2022

(54) FLUID HANDLING METHOD, FLUID HANDLING DEVICE USED IN SAME, AND FLUID HANDLING SYSTEM

(71) Applicant: Enplas Corporation, Saitama (JP)

(72) Inventor: Nobuya Sunaga, Saitama (JP)

(73) Assignee: Enplas Corporation, Saitama (JP)

( * ) Notice: Subject to any disclaimer, the term of this patent is extended or adjusted under 35 U.S.C. 154(b) by 146 days.

(21) Appl. No.: 16/957,758

(22) PCT Filed: Dec. 14, 2018

(86) PCT No.: PCT/JP2018/046104
§ 371 (c)(1),
(2) Date: Jun. 25, 2020

(87) PCT Pub. No.: WO2019/131217
PCT Pub. Date: Jul. 4, 2019

(65) Prior Publication Data
US 2021/0370302 A1    Dec. 2, 2021

(30) Foreign Application Priority Data

Dec. 27, 2017 (JP) .............................. JP2017-251261

(51) Int. Cl.
*B01L 3/00* (2006.01)

(52) U.S. Cl.
CPC ... *B01L 3/502784* (2013.01); *B01L 2200/027* (2013.01); *B01L 2400/0409* (2013.01)

(58) Field of Classification Search
CPC ....... B01L 2200/027; B01L 2400/0409; B01L 3/502784; G01N 1/00; G01N 1/10; G01N 35/08; G01N 37/00
See application file for complete search history.

(56) References Cited

U.S. PATENT DOCUMENTS 9,126,160 B2    9/2015 Ness et al.
2009/0197977 A1*  8/2009 Haeberle ............... B01F 3/0807
                                                         516/10
(Continued)

FOREIGN PATENT DOCUMENTS

WO    WO 2019/131217    7/2019

OTHER PUBLICATIONS

International Search Report and the Written Opinion dated Mar. 12, 2019 From the International Searching Authority Re. Application No. PCT/JP2018/046104 and Its Translation of Search Report Into English. (9 Pages).

*Primary Examiner* — Jennifer Wecker
*Assistant Examiner* — Jonathan Bortoli (57) ABSTRACT

The purpose of the present invention is to provide a liquid handling method that makes it possible to simply isolate a droplet, a fluid handling device used in this method, and a fluid handling system. This fluid handling method serves to flow a fluid including a solvent and a droplet through a fluid handling device comprising an inlet, a first flow path having one end connected to the inlet, a chamber connected to the other end of the first flow path, a second flow path having one end connected to the chamber, and an outlet connected to the other end of the second flow path. This fluid handling method includes an introduction step for introducing the fluid through the inlet and accommodating the droplet in the chamber, a rotation step for rotating the fluid handling device after the introduction step, and a removal step for removing the droplet from the inside of the chamber after the rotation step. In the introduction step, the fluid handling device is disposed such that the chamber widens from the position where the chamber and the second flow path are connected in the direction opposite from the direction of gravity.

7 Claims, 7 Drawing Sheets

(56) References Cited

U.S. PATENT DOCUMENTS

2015/0267246 A1* 9/2015 Baroud ............... B01L 3/50273
  506/9
2018/0133715 A1* 5/2018 Craig ................ B01L 3/502784

* cited by examiner

FLUID HANDLING METHOD, FLUID HANDLING DEVICE USED IN SAME, AND FLUID HANDLING SYSTEM

TECHNICAL FIELD

The present invention relates to a fluid handling method, and a fluid handling device and a fluid handling system used for the method.

BACKGROUND ART

In clinical, dietary, and environmental tests, high-precision analysis of cells, proteins, nucleic acids, and other trace amounts of analytes is often required. One of the methods to analyze trace amounts of analytes is a method in which minute droplets (hereinafter referred to as "droplets") with a diameter of 0.1 to 1,000 µm are generated from a liquid containing the analyte to observe and analyze them.

The generated droplets are usually collected in microtubes, etc. In general, the necessary number of droplets is separated from the microtubes, and various observations and analyses are performed. A device having a needle is proposed as a device for separating a droplet collected in a microtubule, etc. (for example PTL 1).

CITATION LIST

Patent Literature

PTL 1
U.S. Pat. No. 9,126,160

SUMMARY OF INVENTION

Technical Problem

However, when the droplet is separated by the device described in the above PTL 1, a means for suctioning the droplet and a means for controlling the position of the needle are required, and consequently the device tends to be large in size. If the specific gravity of the droplet is smaller than the specific gravity of the solvent, the droplets will collect on the liquid surface side in the microtube. Therefore, when the droplets are separated by a needle, air enters the needle, and it is not possible to observe and analyze the droplets sufficiently because of the bubbles.

It is also conceivable to directly observe the droplets collected in the microtubes. However, in the microtubes, the droplets overlap one another. Therefore, it is difficult to observe and analyze individual droplets.

To solve the above-mentioned problems, an object of the present invention is to provide a liquid handling method that can readily separate droplets, and a fluid handling device and a fluid handling system used for the method.

Solution to Problem

The present invention provides the following fluid handling method.

A fluid handling method of moving a fluid containing a droplet and a solvent in a fluid handling device, the fluid handling device including an inlet, a first channel connected to one end of the inlet, a chamber connected to another end of the first channel and configured to accommodate the droplet, a second channel whose one end is connected to the chamber, and an outlet connected to another end of the second channel, the method including: introducing the fluid from the inlet to accommodate the droplet in the chamber; rotating the fluid handling device after the introducing of the fluid; and ejecting the droplet from the chamber after the rotating of the fluid handling device. In the introducing of the fluid, the fluid handling device is disposed such that the chamber is widened on a side opposite to a connection position of the chamber and the second channel in a gravity direction.

The present invention also provides the following fluid handling device.

A fluid handling device used for the above-mentioned method, the fluid handling device including: a main body part and a film that are stacked on each other, wherein the main body part includes a recess configured to constitute a part of an inner wall of the chamber, a first groove connected to the recess and configured to constitute a part of an inner wall of the first channel, and a second groove connected to the recess and configured to constitute a part of an inner wall of the second channel.

Further, the present invention also provides the following fluid handling system.

A fluid handling system including: the above-mentioned fluid handling device; a holding mechanism configured to hold the fluid handling device; and a turning mechanism configured to turn the fluid handling device.

Advantageous Effects of Invention

According to the present invention, it is possible to provide a liquid handling method that can readily separate droplets, and a fluid handling device and a fluid handling system used for the method.

DESCRIPTION OF EMBODIMENTS

An embodiment of the present invention is elaborated below with reference to the accompanying drawings. Note that the dimensions or ratios of dimensions shown in the drawings may differ from the actual dimensions or ratios of dimensions in order to make the explanation easier to understand. In addition, as used herein, "upper side" means the side opposite to the side of the gravity direction in each of the introduction process and the ejection process, and "lower side" means the side of the gravity direction in each of the introduction process and the ejection process described later.

The fluid handling method fluid according to the embodiment of the present invention is a method of moving fluid containing a solvent (hereinafter referred to also as "mother phase solvent") and a droplet containing an object to be sorted (e.g., cell, DNA, and enzyme such as protein) in the handling device. According to the method, it is possible to store droplets in the fluid handling device, to increase the concentration of droplets in fluid, and to observe droplets accommodated in the fluid handling device. It is also possible to take out the desired number of droplets from the fluid handling device without allowing air to enter.

The droplet typically contains an object to be sorted, and dispersion solvent for dissolving and dispersing the object. Each droplet may be a substantially spherical droplet having a particle size of 0.1 μm to 1000 μm, and it is preferable that the particle size be 5 μm to 200 μm, for example. The droplet may be prepared publicly by a known method. On the other hand, it suffices that the mother phase solvent contained in the fluid is a solvent (hereinafter referred to also as "mother phase solvent") having a low compatibility with the object to be sorted and/or the dispersion solvent contained in the droplet, and may be appropriately selected in accordance with the type of the droplet.

In the present embodiment, the difference between the specific gravity of the droplet and the specific gravity of the mother phase solvent is used to efficiently accommodate the droplet in the chamber described later and to efficiently eject it from the chamber. In the following explanation, the specific gravity of the droplet is smaller than the specific gravity of the mother phase solvent. However, the specific gravity of the droplets may be greater than the specific gravity of the mother phase solvent. In this case, it suffices that the fluid handling device is installed such that the orientation (the top and the bottom) of the fluid handling device is opposite between the first and second states of the fluid handling device described later. Below, fluid handling device 100 used for the fluid handling method will be explained first, followed by the fluid handling method.

Fluid Handling Device

Fluid handling device 100 of the present embodiment includes introduction part 113 for introducing fluid, first channel 114 whose one end is connected to introduction part 113, the chamber 115 connected to the other end of first channel 114, second channel 116 connected to one end of chamber 115, and outlet 117 connected to the other end of second channel 116. Fluid handling device 100 is composed of main body part 110, and film 120 bonded on one surface (hereinafter referred to also as "front surface") 111 of the main body part 110.

Figure 1A:
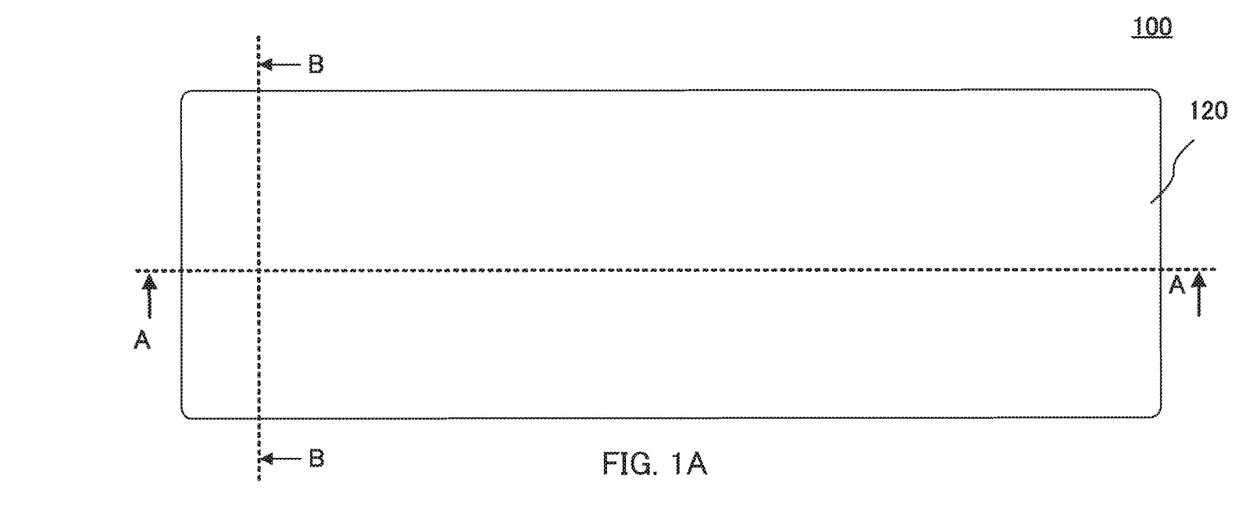
FIG. 1A is a plan view illustrating a configuration of a fluid handling device according to a first embodiment.
Figure 1B:
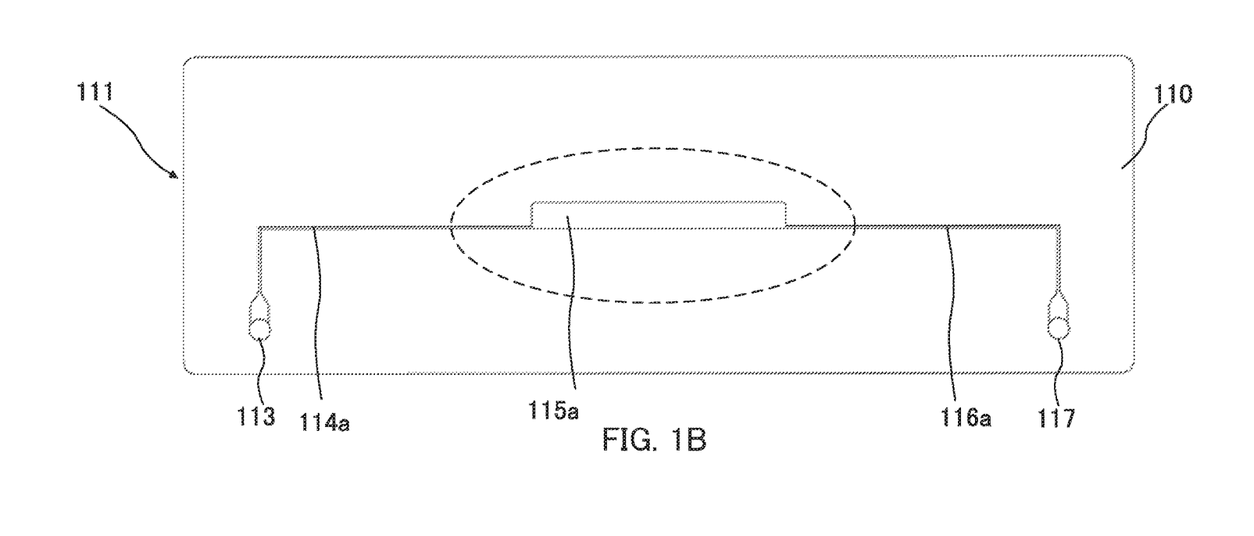
FIG. 1B is a plan view illustrating a configuration of a main body part of the fluid handling device.
Figure 2A:
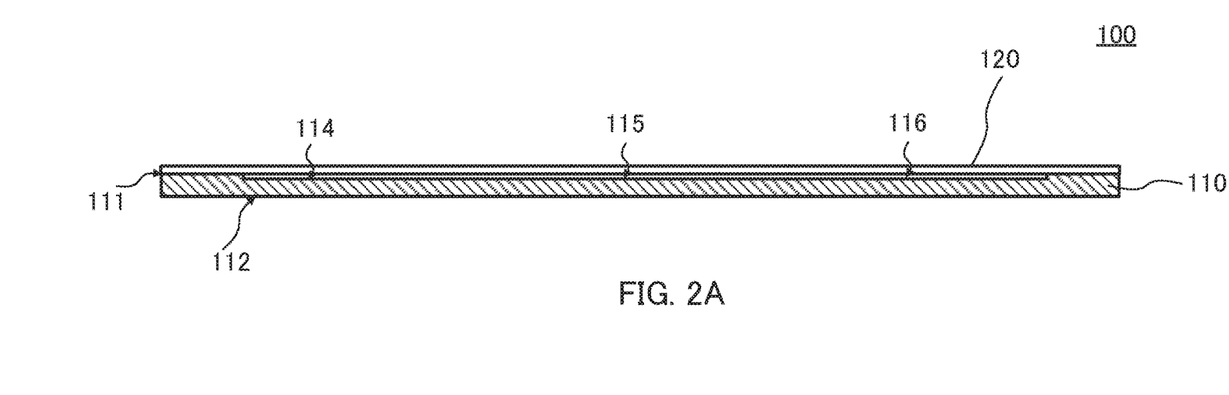
FIG. 2A is a sectional view of the fluid handling device taken along line A-A illustrated in FIG. 1A.
Figure 2B:
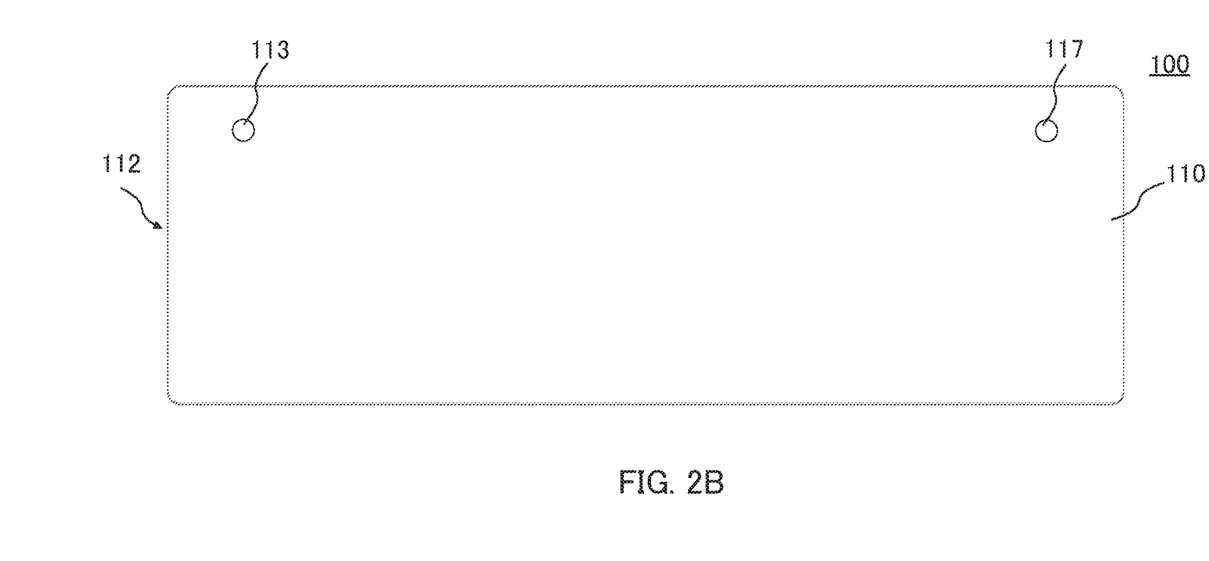
FIG. 2B is a bottom view of the fluid handling device illustrated in FIG. 1A.
Figure 2C:
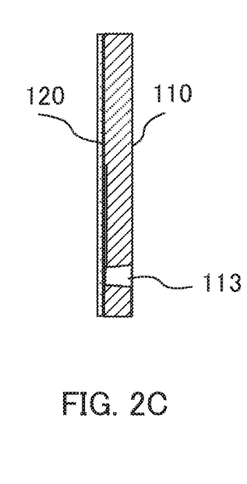
FIG. 2C is a sectional view taken along line B-B of the fluid handling device illustrated in FIG. 1A.
Figure 3:
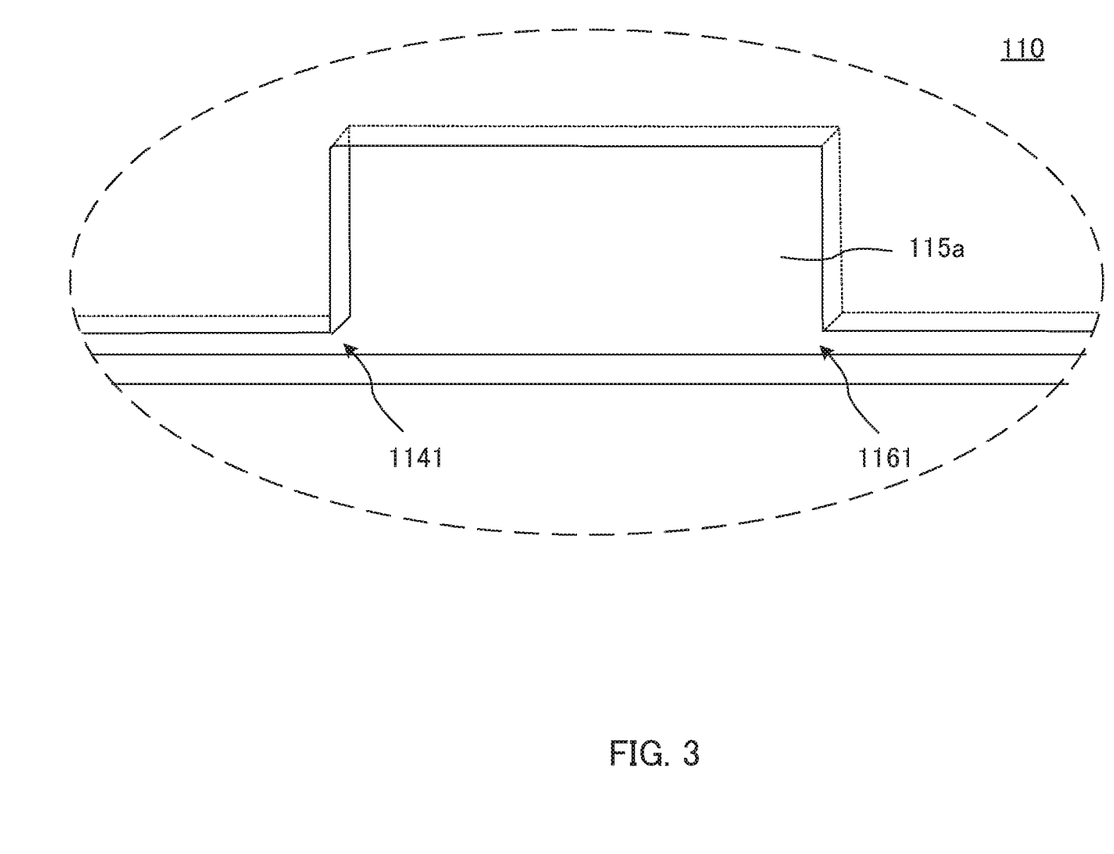
FIG. 3 is a partially enlarged view of a part indicated by a broken line in the main body part illustrated in FIG. 1B.
Figure 4A:
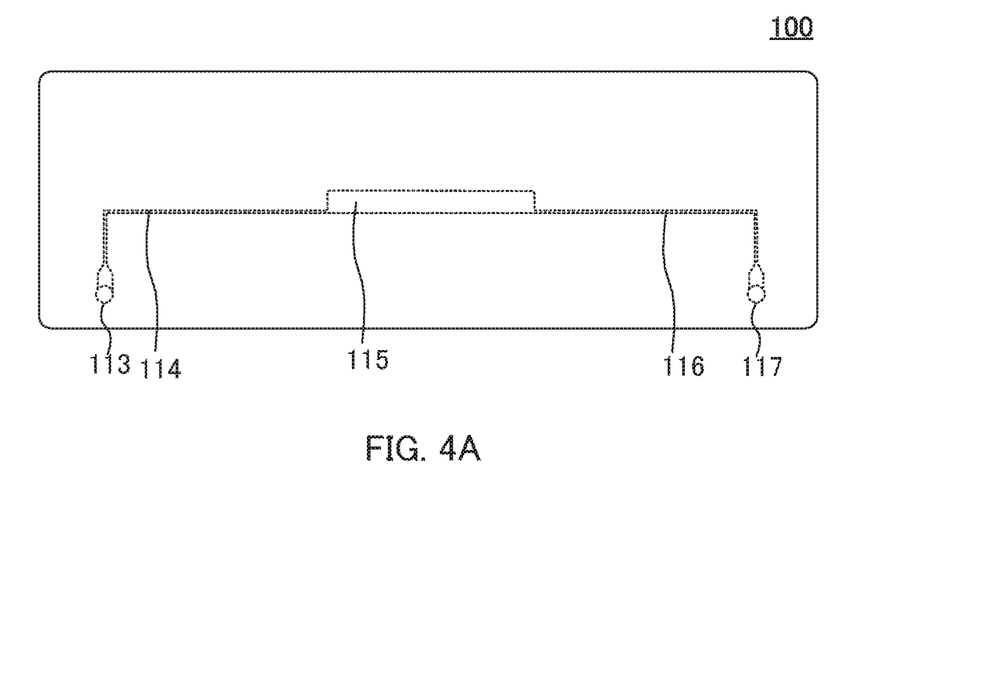
FIG. 4A illustrates a state of the fluid handling device illustrated in FIG. 1A in an introduction process.
Figure 4B:
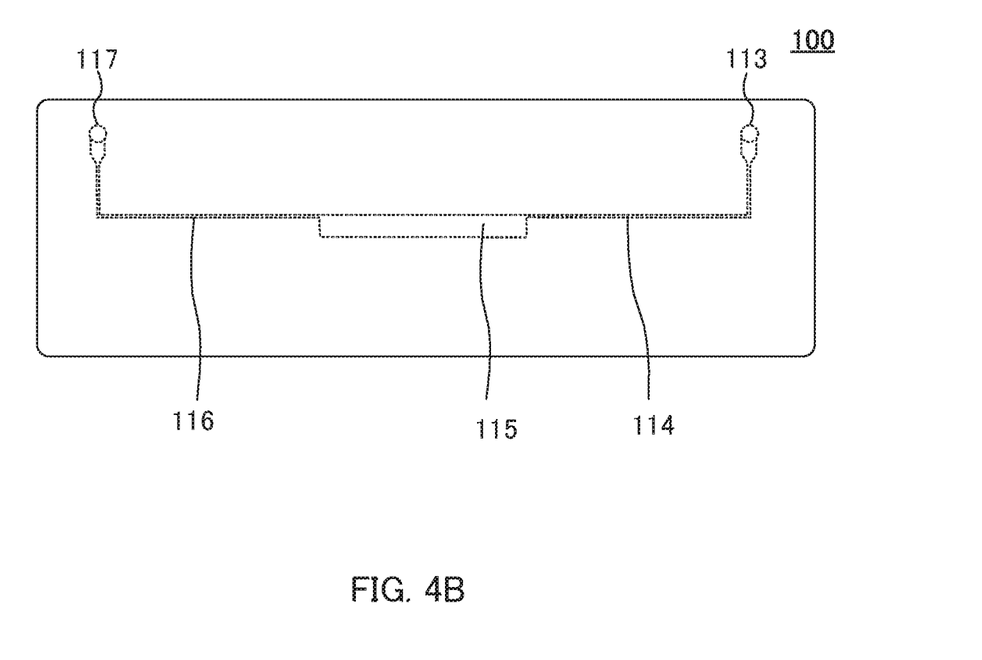
FIG. 4B illustrates a state of the fluid handling device in an ejection process.

FIG. 1A is a plan view illustrating a state where fluid handling device 100 is disposed such that film 120 is the top surface of fluid handling device 100, and FIG. 1B is a plan view of main body part 110 of a state where film 120 is removed from fluid handling device 100. FIG. 2A is a sectional view taken along line A-A of FIG. 1A, FIG. 2B is a bottom view of fluid handling device 100, and FIG. 2C is a sectional view taken along line B-B of FIG. 1A. FIG. 3 is a perspective view of main body part 110 in a region surrounded by a broken line in FIG. 1B. FIG. 4A illustrates a state (hereinafter referred to also as "first state") of fluid handling device 100 in a fluid introduction process, and FIG. 4B illustrates a state (hereinafter referred to also as "second state") of fluid handling device 100 in a droplet ejection process. Note that FIGS. 4A and 4B are diagrams as viewed from the upper side.

Film 120 may be a flat film that covers main body part 110. The region surrounded by film 120 and first groove 114a of main body part 110 described later is first channel 114, and the region surrounded by film 120 and recess 115a of main body part 110 is chamber 115. The region surrounded by film 120 and second groove 116a of main body part 110 is second channel 116.

Film 120 may be any film made of a material that is not eroded by the fluid (especially the mother phase solvent or the solvent in the droplet) introduced to the fluid handling device, and the thickness thereof and the like are appropriately selected. Examples of the material of film 120 include polyester such as polyethylene terephthalate; polycarbonate; acrylic resins such as polymethyl methacrylate; polyvinyl chloride; polyolefins such as polyethylene, polypropylene and cyclo-olefin resins; polyether; polystyrene; silicone resins; and resin materials such as various elastomers.

In the present embodiment, as described later, observation and analysis of droplets are performed from the film 120 side in the state where droplets are accommodated in chamber 115. Therefore, the material of film 120 is selected such that film 120 is optically transparent. Note that film 120 may not be optically transparent in the case where droplets are observed from the rear surface 112 side of main body part 110, or the case where droplets are not observed.

On the other hand, main body part 110 of the present embodiment includes inlet 113 for introducing fluid into fluid handling device 100, first groove 114a that constitutes a part of first channel 114, recess 115a that constitutes a part of chamber 115, second groove 116a that constitutes a part of second channel 116, and outlet 117 for ejecting fluid from fluid handling device 100.

Inlet 113 is a through hole through which the front surface 111 side and the rear surface 112 side of main body part 110 are connected, and inlet 113 is connected to one end of first groove 114a. In the present embodiment, inlet 113 is a columnar through hole, but the shape of inlet 113 is not limited to that shape. In addition, the inner diameter of inlet 113 is not limited as long as a tube for introducing droplets (not illustrated) and the like can be inserted from the rear surface 112 side of main body part 110. In the present embodiment, from the viewpoint of reliably introducing fluid into fluid handling device 100, the outer diameter of the tube and the inner diameter of inlet 113 are approximately equal to each other.

First groove 114a is a groove provided on the main body part 110 side of front surface 111. One end of first groove 114a is connected to inlet 113 and the other end of first groove 114a is connected to recess 115a. In the present embodiment, first groove 114a has an L-shape as viewed from the front surface 111 side of main body part 110, but the shape is not limited to that shape. First groove 114a may have a straight-line shape or a curved line shape that connects between inlet 113 and recess 115a, for example.

The position of connection portion 1141 of first groove 114a and recess 115a is not limited; however, from the viewpoint of efficiently accommodating droplet in chamber 115, it is preferable to dispose connection portion 1141 of first groove 114a and recess 115a at a position on the lower end (bottom surface) side relative to the center point between the lower end (bottom surface) of chamber 115 and upper end (top surface) of chamber 115, i.e., at a position of ½ or lower of the height of chamber 115 in the introduction process described later. In the present embodiment, in the introduction process, connection portion 1141 of first groove 114a and recess 115a is disposed in the vicinity of the bottom surface of chamber 115. Note that, from the viewpoint of preventing damage to the droplets, it is preferable that first groove 114a and recess 115a are connected together through a curved surface.

While, as viewed from the front surface side of main body part 110, the width of first groove 114a is wider in the vicinity of inlet 113 in the present embodiment, the width of first groove 114a may be constant from inlet 113 side to recess 115a side.

Further, the cross-sectional shape of first groove 114a in the direction perpendicular to the flow direction of the fluid is not limited. While first groove 114a is a recessed groove having a rectangular shape in the present embodiment, the groove may be a recessed groove of a semicircular shape or a trapezoidal shape. Note that, from the viewpoint of preventing damage to the droplet, it is preferable that no protrusion is provided in the groove. In addition, the width and depth of first groove 114a are not limited as long as the droplet can move in the first channel without being damaged. In the case where the particle size of the droplet is 100 µm for example, the minimum value of the width and depth of first groove 114a (first channel 114) in the cross-section perpendicular to the flow direction of the fluid is preferably 10 µm or greater, more preferably 20 µm or greater from the viewpoint of preventing damage to the droplet. That is, the minimum value of the width and depth of first groove 114a (first channel 114) in the cross-section perpendicular to the flow direction of the fluid is preferably 1/10 or greater, more preferably 1/5 or greater with respect to the particle size of the droplet. In addition, from the viewpoint of preventing damage to the droplet, the cross-sectional area of first groove 114a (first channel 114) in the cross-section perpendicular to the flow direction of the fluid is preferably 1/7 times or greater of the cross-sectional area of the droplet. Note that, as used herein, "the cross-sectional area of the droplet" means the cross-sectional area of the cross-section passing through the circular center of the droplet. Note that, in the present embodiment, the depth (the depth in the direction from front surface 111 toward rear surface 112 of main body part 110) of first groove 114a is approximately the same as the depth (the depth in the direction from front surface 111 toward rear surface 112 of main body part 110) of recess 115a described later. Note that the depth of first groove 114a may be different from the depth of recess 115a.

On the other hand, recess 115a disposed in main body part 110 is a bottomed recess that is provided in front surface 111 side of main body part 110 for the purpose of accommodating droplets. It suffices that recess 115a is formed in a shape with which a space for accommodating droplets is formed on the upper side of connection portion 1161 of recess 115a and second groove 116a in the introduction process described later.

While the shape of recess 115a as viewed from the front surface 111 side of main body part 110 is a rectangular shape in the present embodiment, the shape may be a circular shape, an elliptical shape, a prismatic shape, and the like for example. In addition, the area of recess 115a as viewed from the front surface 111 side of main body part 110 is appropriately selected in accordance with the desired capacity for droplets. The area may be an area capable of accommodating a large number of droplets, or an area capable of accommodating only a small number of droplets.

In addition, the cross-sectional shape of recess 115a in the direction perpendicular to the flow direction of the fluid is not limited. While recess 115a is a region recessed in a rectangular shape in the present embodiment, it may be recessed in a semicircular shape, a trapezoidal shape or the like. Note that the depth (the depth in the direction from front surface 111 toward rear surface 112 of main body part 110) of recess 115a is preferably a depth with which the droplets do not overlap when the droplets are viewed from the film 120 side in a droplet observation process described later.

In addition, second groove 116a is a groove that is connected to recess 115a at one end, and is connected to outlet 117 at the other end. Second groove 116a is provided on the front surface 111 side of main body part 110. In the present embodiment, second groove 116a has an L-shape as viewed from the front surface 111 side of main body part 110. Note that the shape of second groove 116a is not limited the above-mentioned shape, and may have a straight-line shape or a curved line shape that connects between recess 115a and outlet 117.

In addition, while the position of connection portion 1161 of second groove 116a and recess 115a is not limited, it is preferable that connection portion 1161 of second groove 116a and recess 115a is disposed at a position on the lower end (bottom surface) side relative to the center point between the lower end (bottom surface) and the upper end (top surface) of chamber 115, i.e., at a position of ½ or lower of the height of chamber 115 in the introduction process from the viewpoint of preventing ejection of droplets from chamber 115 in the introduction process described later. On the other hand, in the ejection process described later, it is preferable that connection portion 1161 of second groove 116a and recess 115a is disposed at a position on the upper end (top surface) side relative to the center point between the lower end (bottom surface) and the upper end (top surface) of chamber 115, i.e., at a position of ½ or higher of the height of chamber 115 from the viewpoint of efficiently ejecting droplets from the chamber. In fluid handling device 100 of the present embodiment, in the introduction process, connection portion 1161 of second groove 116a and recess 115a is disposed in the vicinity of the bottom surface of chamber 115. On the other hand, in the ejection process, connection portion 1161 of second groove 116a and recess 115a is disposed in the vicinity of the top surface of chamber 115. Note that, from the viewpoint of preventing damage to the droplet, second groove 116a and recess 115a are connected together through a curved surface.

In addition, in the present embodiment, while the width of second groove 116a is wider in the vicinity of outlet 117 as viewed from the front surface side of main body part 110, the width of second groove 116a may be constant from the outlet 117 side toward the recess 115a side.

Further, the cross-sectional shape of second groove 116a in the direction perpendicular to the flow direction of the fluid is not limited. While second groove 116a is a groove having a rectangular recess in the present embodiment, it is possible to adopt a groove having a recess of a semicircular shape or a trapezoidal shape, and the like. Note that, from the viewpoint of preventing damage to the droplet, it is preferable that no protrusion is provided in the groove. The width and depth of second groove 116a are not limited as long as the droplet can move through the second channel while preventing damage to the droplet. From the viewpoint of preventing damage to the droplet, in the case where the particle size of the droplet is 100 µm, for example, the minimum value of the width and depth of second groove 116a (second channel 116) in the cross-section perpendicular to the flow direction of the fluid is preferably 10 µm or greater, more preferably 20 µm or greater. Specifically, the minimum value of the width and depth of second groove 116a (second channel 116) in the cross-section perpendicular to the flow direction of the fluid is preferably 1/10 or greater, more preferably 1/5 or greater with respect to the particle size of the droplet. From the viewpoint of preventing damage to the droplet, the cross-sectional area of second groove 116a (second channel 116) in the cross-section perpendicular to the flow direction of the fluid is preferably 1/7 times or greater of the cross-sectional area of the droplet. Note that, in the present embodiment, the depth (the depth in the direction from front surface 111 toward rear surface 112 of main body part 110) of second groove 116a is approximately the same as the depth (the depth in the direction from front surface 111 toward rear surface 112 of main body part 110) of the recess 115a. Note that the depth of second groove 116a may be different from the depth of recess 115a.

In addition, outlet 117 is a through hole that communicates between the rear surface 112 side and the front surface 111 side of main body part 110, and outlet 117 is connected to one end of second groove 116a. While outlet 117 is a columnar through hole in the present embodiment, the shape of outlet 117 is not limited to that shape. In addition, the inner diameter of the outlet 117 is not limited as long as a tube (not illustrated) for ejecting the droplet and the like can be inserted from the rear surface 112 side of main body part 110. In the present embodiment, from the viewpoint of reliably ejecting fluid from fluid handling device 100, the inner diameter of the outlet 117 is approximately the same as the outer diameter of the tube.

Examples of the material of main body part 110 include polyester such as polyethylene terephthalate; polycarbonate; an acrylic resin such as polymethylmethacrylate; polyvinyl chloride; polyolefin such as polyethylene, polypropylene, and cycloolefin resin; polyether; polystyrene; silicone resin; and a resin material such as various types of elastomer. In addition, the main body part having the above-mentioned configuration can be molded by an injection molding or the like, for example.

Here, main body part 110 may be or may not be optically transparent. In the case where observation, analysis and/or the like of the droplet is performed from the rear surface 112 side of main body part 110 with the droplet accommodated in chamber 115, the material is selected such that main body part 110 is optically transparent.

In addition, main body part 110 and film 120 may be joined together by a publicly known method such as heat fusing and bonding with an adhesive agent.

Fluid Handling Method

A fluid handling method using fluid handling device 100 is described below. First, the droplet manufacturing device (not illustrated) and the like is connected to inlet 113 of fluid handling device 100 with a tube (not illustrated) and the like. On the other hand, outlet 117 of fluid handling device 100 is connected to a container (not illustrated) for collecting a mother phase solvent, a droplet and the like with a tube (not illustrated) and the like. In addition, first channel 114, chamber 115 and second channel 116 are filled with a solvent that does not contain droplets in advance. Note that, "solvent that does not contain droplets" can be any solvent that has low compatibility with the droplet and has a higher specific gravity than the droplet. For example, it may be identical to or different from the above-described mother phase solvent.

Then, the orientation of fluid handling device 100 is changed as necessary to dispose fluid handling device 100 (or to set a first state) such that chamber 115 is widened on the upper side of the connection portion of chamber 115 and second channel 116, and that the connection portion of chamber 115 and second channel 116 is on the lower end side relative to the center point between the lower end (bottom surface) and the upper end (top surface) of chamber 115. Then, fluid is introduced into first channel 114 from inlet 113 to accommodate the droplet inside chamber 115 (introduction process). At this time, as necessary, the flow of the fluid may be facilitated by exerting pressure from the inlet 113 side, or by suction from the outlet 117 side. In the first state of fluid handling device 100, the droplets having entered chamber 115 gather in an upper portion in chamber 115 (on the upper side of connection portion 1161 of recess 115a and second groove 116a). As a result, it becomes difficult for the droplets to be ejected out of chamber 115 from the connection portion of chamber 115 and second channel 116 disposed on the lower side of chamber 115, and thus the droplets are efficiently accommodated in chamber 115.

In the present embodiment, after accommodating a desired mount of droplets in chamber 115, the droplets in chamber 115 are observed from the film 120 side. As described above, in the present embodiment, chamber 115 is configured such that droplets do not overlap one another during the observation. Thus, all droplets can be observed and analyzed from the film 120 side. The observation of the droplet is appropriately selected in accordance with the type of the object to be sorted contained in the droplet, and is, for example, detection of fluorescently labeled proteins.

Thereafter, fluid handling device 100 is rotated 180 degrees such that its top and bottom surfaces are opposite to the first state (rotation process). To be more specific, fluid handling device 100 is disposed (or a second state is set) such that the connection portion of chamber 115 and second channel 116 is located on the upper end side relative to the center point between the lower end (bottom surface) and the upper end (top surface) of chamber 115. In this state, the droplet is ejected from the chamber 115 (ejection process). At this time, as necessary, the flow of the droplet may be facilitated by exerting pressure from the inlet 113 side, and by introducing a solvent that does not contain droplets from inlet 113.

When fluid handling device 100 is set to the second state in the rotation process, the droplets move in the direction toward the upper side of chamber 115 in the second state. Thus, the droplets are efficiently ejected from the connection portion of chamber 115 and second channel 116 disposed on the upper side of chamber 115.

Other Embodiments

Figure 5A:
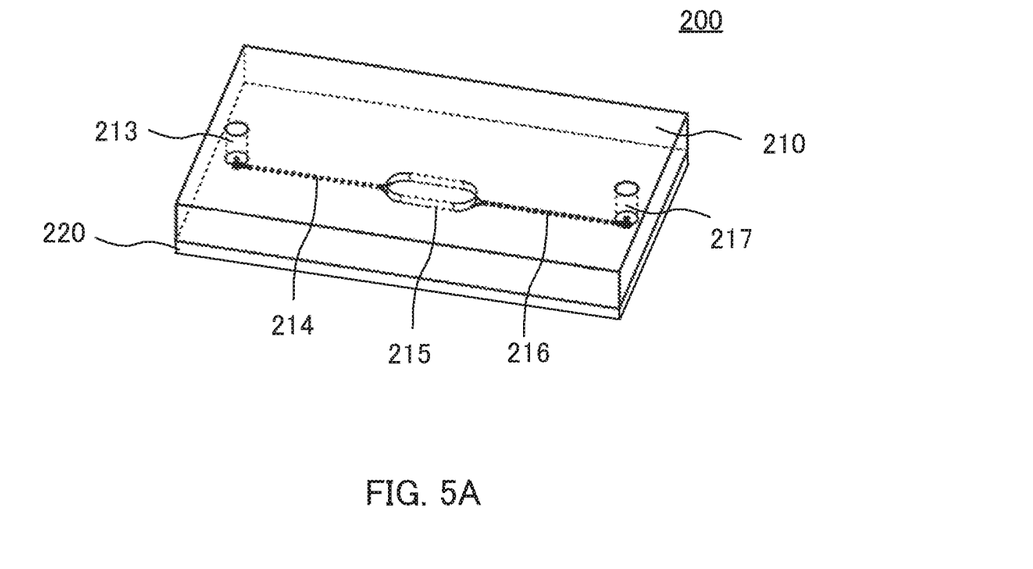
FIG. 5A illustrates a state of a fluid handling device according to another embodiment in an introduction process.
Figure 5B:
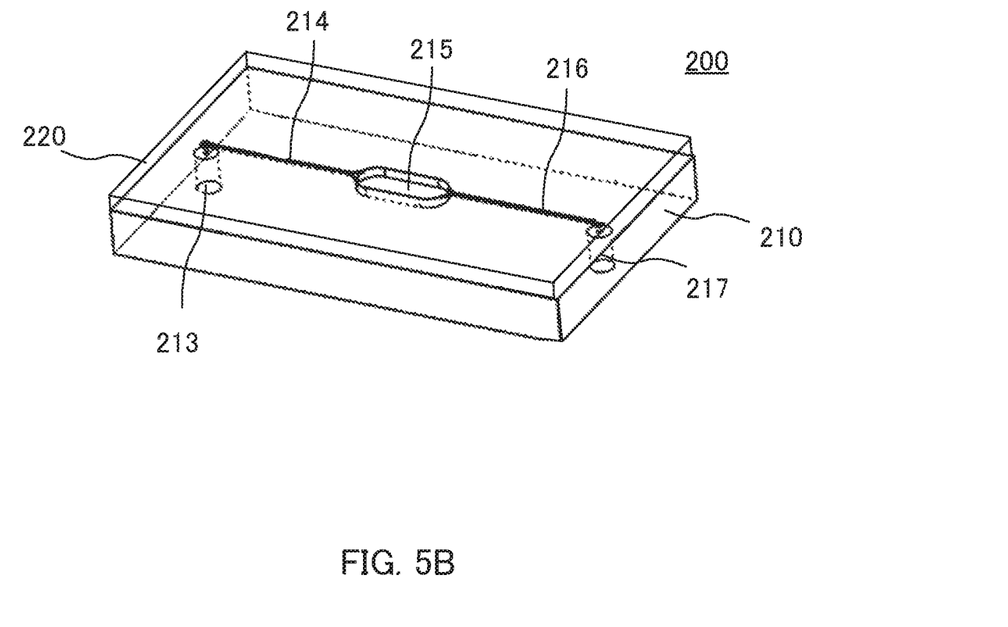
FIG. 5B illustrates a state of the fluid handling device in an ejection process.

FIGS. 5A and 5B illustrate a fluid handling device of another embodiment. FIG. 5A is a perspective view illustrating the first state of fluid handling device 200, i.e., a state for introducing fluid into fluid handling device 200, and FIG. 5B is a perspective view illustrating the second state of fluid handling device 200, i.e., a state for ejecting a droplet from fluid handling device 200. The fluid handling device 200 also includes inlet 213, first channel 214, chamber 215, second channel 216, and outlet 217, and is composed of main body part 210 and film 220 bonded to one surface of main body part 210. In fluid handling device 100 of the embodiment, film 120 is disposed such that the film 120 is located on the lateral side of fluid handling device 100 in both the first state and second state. In contrast, in fluid handling device 200 of the other embodiment, film 220 is disposed such that film 220 is located on the bottom surface side of fluid handling device 200 in the first state and is located on the top surface side of fluid handling device 200 in the second state.

In addition, in the fluid handling device 200, the depth of chamber 215 (the depth in the direction from the front surface side of film 220 to the rear surface side of main body part 210) is larger than the depth of the grooves of first channel 214 and second channel 216 (the depth in the direction from the front surface side of film 220 to the rear surface side of main body part 210). Therefore, when the first state is set, i.e., when fluid handling device 200 is disposed such that chamber 215 is widened on the side opposite to the connection portion of chamber 215 and second channel 216 in the gravity direction, the droplet introduced into channel 214 is efficiently accommodated into an upper portion (in this case, the rear surface side of main body part 210) in chamber 215. On the other hand, when the orientation of fluid handling device 200 is set to the second state by rotating fluid handling device 200, the droplet moves to the film 210 side. Thus, by introducing a solvent that does not contain droplets from inlet 213 or the like, the droplets can be efficiently carried to the second channel 216 side, and the droplets can be ejected from outlet 217.

Figure 6:
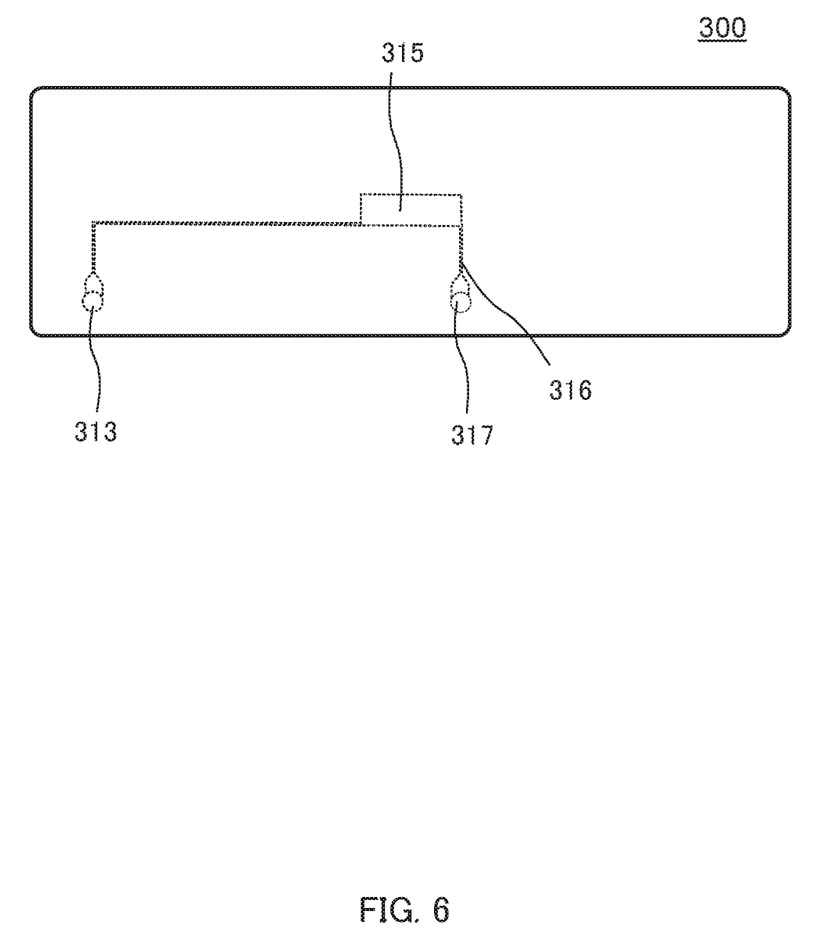
FIG. 6 is a plan view illustrating a configuration of a fluid handling device according to another embodiment.
Figure 7:
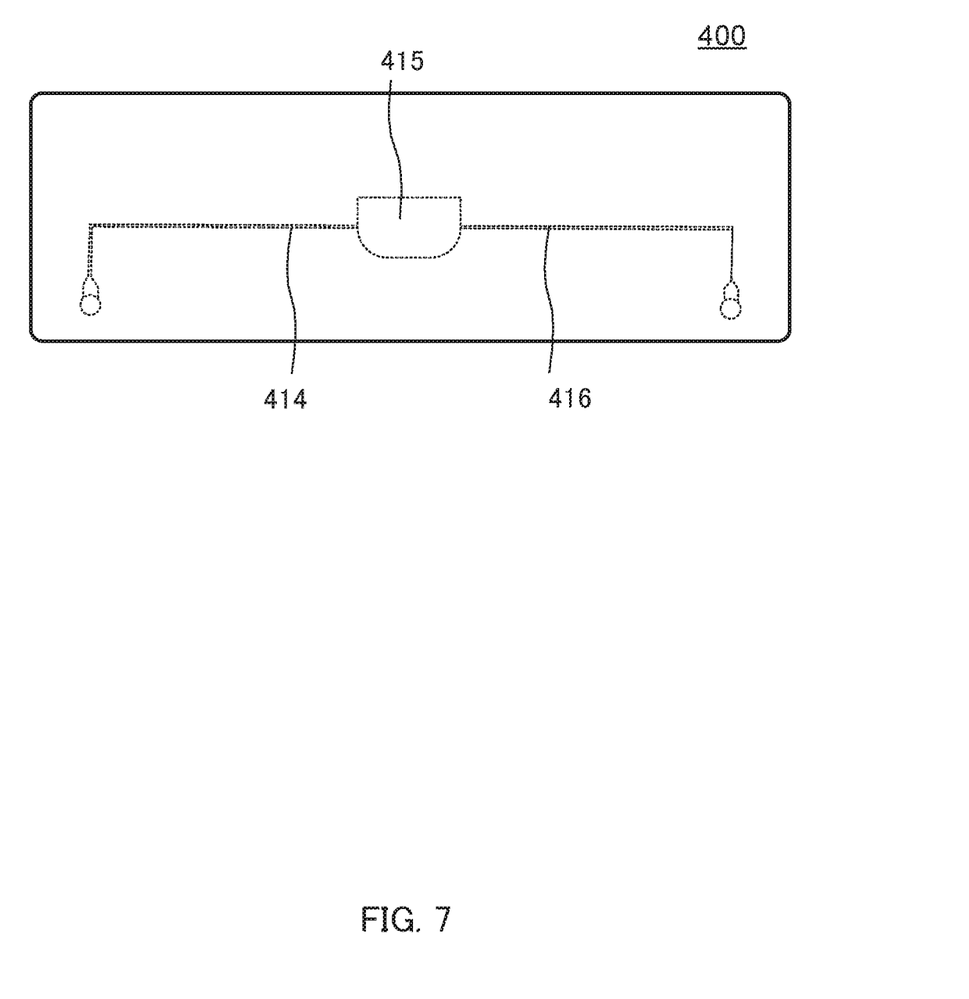
FIG. 7 is a plan view illustrating a configuration of a fluid handling device according to another embodiment.

FIGS. 6 and 7 are plan views illustrating configurations of fluid handling devices 300 and 400 according to other embodiments. Fluid handling device 300 illustrated in FIG. 6 is the same as fluid handling device 100 except that second channel 316 is disposed such that the fluid flows in the direction (to the upper side) opposite to in the gravity direction in the ejection process. Note that FIG. 6 illustrates an arrangement (the first state) of fluid handling device 300 in the introduction process (the upper side in the drawing corresponds to the upper side). In fluid handling device 300, second channel 316 is disposed such that the fluid flows in the direction in which a buoyancy acts on the droplet in the ejection process. In this manner, the droplet can be ejected from chamber 315 to the outlet 317 side not only by the pressure of the liquid fed from inlet 313 in the ejection process, but also by the buoyancy acting on the droplet. Thus, the droplet can be efficiently ejected.

In addition, fluid handling device 400 illustrated in FIG. 7 is the same as fluid handling device 100 except that the connection portion of first channel 414 and chamber 415 and the connection portion of second channel 416 and chamber 415 are formed in the vicinity of the center point between the lower end (bottom surface) and the upper end (top surface) of chamber 415, and that the shape of the bottom surface side of the chamber has a curved surface when the orientation of fluid handling device 400 is set to the first state. Note that FIG. 7 illustrates an arrangement (the first state) of fluid handling device 400 in the introduction process (the upper side in the drawing corresponds to the upper side).

Note that the fluid handling device and the fluid handling method of the embodiments of the present invention are not limit to the above-mentioned embodiments. For example, the positional relationship of the chamber, the first channel, and the second channel may be changed such that the state can be changed from the first state to the second state by rotating at a desired angle (e.g., 90°) in the rotation process.

Effect

By the fluid handling method using the fluid handling device according to the embodiment of the present invention, droplets can be collected without using a large-scale device such as a means for suction and a means for controlling a needle. In addition, it is also possible to separate the droplets from the fluid handling device without mixing air, and thus observation and analysis of the droplets can be performed properly.

In the fluid handling method of the embodiment of the present invention, it is also possible to observe and analyze the droplets and to concentrate the droplets in the fluid handling device. Therefore, the fluid handling method using the fluid handling device of the present invention can be applied to various kinds of tests such as clinical tests, food tests, environmental tests, etc.

Fluid Handling System

The fluid handling device according to the embodiment of the present embodiment may be combined with a turning mechanism for turning the fluid handling device. Specifically, a fluid handling system includes the fluid handling device, a holding mechanism that holds the fluid handling device, and a turning mechanism that turns the fluid handling device from an introduction state (first state) to an ejection state (second state).

This application claims priority based on Patent Application No. 2017-251261, filed on Dec. 27, 2017, the disclosure each of which including the specification, drawings and abstract is incorporated herein by reference in its entirety.

INDUSTRIAL APPLICABILITY

The fluid handling method, the handling device, and the fluid handling system of the embodiments of the present invention can be applied, for example, to clinical tests, food tests, environmental tests, and the like.

REFERENCE SIGNS LIST 100, 200, 300, 400 Fluid handling device
110, 210 Main body part
111 Front surface
112 Rear surface
113, 213, 313 Inlet
114, 214, 414 First channel
114a First groove
115, 215, 315, 415 Chamber
115a Recess
116, 216, 316, 416 Second channel
116a Second groove
117, 217, 317 Outlet
1141 Connection portion of first groove and recess
1161 Connection portion of second groove and recess

What is claimed is:

1. A fluid handling method of moving a fluid containing a droplet and a solvent in a fluid handling device, the fluid handling device including an inlet, a first channel connected to one end of the inlet, a chamber connected to another end of the first channel and configured to accommodate the droplet, a second channel whose one end is connected to the chamber, and an outlet connected to another end of the second channel, the method comprising:
 introducing the fluid from the inlet to accommodate the droplet in the chamber;

rotating the fluid handling device after the introducing of the fluid; and ejecting the droplet from the chamber after the rotating of the fluid handling device, wherein in the introducing of the fluid, the fluid handling device is disposed such that the chamber is widened on a side opposite to a connection position of the chamber and the second channel in a gravity direction.

2. The method according to claim 1, wherein in the ejecting of the droplet, the droplet is ejected while liquid that does not contain the droplet is introduced from the inlet.

3. The method according to claim 1, wherein a specific gravity of the droplet is smaller than a specific gravity of the solvent;

in the introducing of the fluid, a connection portion of the second channel and the chamber is disposed between a lower end of the chamber and a center point between the lower end and an upper end of the chamber; and in the ejecting of the droplet, the connection portion of the second channel and the chamber is disposed between the upper end of the chamber and the center point between the lower end and the upper end of the chamber.

4. The method according to claim 1, further comprising observing the droplet accommodated in the chamber.

5. The method according to claim 4, wherein the chamber has a configuration in which a plurality of the droplets does not overlap one another in the observing of the droplet.

6. A fluid handling device used for the method according to claim 1, the fluid handling device comprising:

a main body part and a film that are stacked on each other, wherein the main body part includes a recess configured to constitute a part of an inner wall of the chamber, a first groove connected to the recess and configured to constitute a part of an inner wall of the first channel, and a second groove connected to the recess and configured to constitute a part of an inner wall of the second channel.

7. A fluid handling system comprising:

the fluid handling device according to claim 6;

a holding mechanism configured to hold the fluid handling device; and a turning mechanism configured to turn the fluid handling device.

* * * * *